(12) United States Patent
Fritzsching et al.

(10) Patent No.: US 10,744,444 B2
(45) Date of Patent: Aug. 18, 2020

(54) FILTER ELEMENT, IN PARTICULAR FOR GAS FILTRATION, AND FILTER DEVICE

(71) Applicant: MANN+HUMMEL GmbH, Ludwigsburg (DE)

(72) Inventors: Torsten Fritzsching, Vaihingen (DE); Pedro Miguel Pereira Madeira, Bietigheim-Bissingen (DE); Nadine Donauer, Fellbach (DE); Andreas Franz, Ludwigsburg (DE); Marcel Holzwarth, Fayetteville, NC (US); Manfred Winter, Bad Rappenau (DE); Martin Gruber, Gangkofen (DE); Joachim-Paul Krieger, Reisbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/179,361

(22) Filed: Nov. 2, 2018

(65) Prior Publication Data

US 2019/0070549 A1 Mar. 7, 2019

Related U.S. Application Data

(63) Continuation of application No. PCT/EP2017/060457, filed on May 3, 2017.

(30) Foreign Application Priority Data

May 3, 2016 (DE) .................. 10 2016 005 356

(51) Int. Cl.
*B01D 46/24* (2006.01)
*B01D 46/00* (2006.01)
*B01D 46/52* (2006.01)

(52) U.S. Cl.
CPC ...... *B01D 46/2414* (2013.01); *B01D 46/0005* (2013.01); *B01D 46/522* (2013.01);
(Continued)

(58) Field of Classification Search
CPC ............ B01D 46/2414; B01D 46/0005; B01D 2265/06; B01D 2271/027; B01D 2265/028
See application file for complete search history.

(56) References Cited

U.S. PATENT DOCUMENTS

| 2012/0067017 A1 | 3/2012 | Baseotto |
| 2015/0101299 A1 | 4/2015 | Osendorf et al. |

FOREIGN PATENT DOCUMENTS

| DE | 102005016841 A1 | 11/2005 |
| DE | 102008027279 A1 | 4/2009 |

(Continued)

*Primary Examiner* — Robert Clemente
(74) *Attorney, Agent, or Firm* — James Hasselbeck

(57) ABSTRACT

A filter element has a filter medium body enclosing an inwardly positioned flow space and having a center axis. A support frame is arranged at an inner side of the filter medium body. At least one circumferentially extending sealing ring lip is arranged at the filter medium body and projects axially in an axial direction relative to the center axis past an end face of the filter medium body. The sealing ring lip is designed to seal relative to a housing component of a receiving filter housing. A support ring is arranged at the end face of the filter medium body at a radial distance to the sealing ring lip in a radial direction relative to the center axis. The support ring is supported in the radial direction at the support frame and is formed as one piece together with the support frame.

9 Claims, 2 Drawing Sheets

(52) U.S. Cl.
CPC ............ *B01D 2201/4084* (2013.01); *B01D 2265/028* (2013.01); *B01D 2265/06* (2013.01); *B01D 2271/027* (2013.01)

(56) References Cited

FOREIGN PATENT DOCUMENTS

| | | |
|---|---|---|
| DE | 112008002433 A5 | 4/2009 |
| DE | 102010010964 A1 | 9/2011 |
| DE | 112012004521 T5 | 8/2014 |
| EP | 0943365 B1 | 9/1999 |
| EP | 2396102 A1 | 8/2010 |
| EP | 2227307 B1 | 9/2010 |
| EP | 2764904 A1 | 8/2014 |
| JP | S58106553 U | 7/1983 |
| JP | 2003222244 A | 8/2003 |
| WO | 0102079 A1 | 1/2001 |
| WO | 2014078796 A2 | 5/2014 |

FILTER ELEMENT, IN PARTICULAR FOR GAS FILTRATION, AND FILTER DEVICE

CROSS-REFERENCE TO RELATED APPLICATIONS

This application is a continuation application of international application No. PCT/EP2017/060457, having an international filing date of 3 May 2017 and designating the United States, the international application claiming a priority date of 3 May 2016 based on prior filed German patent application No. 10 2016 005 356.9, the entire contents of the aforesaid international application and the aforesaid German patent application being incorporated herein by reference.

BACKGROUND OF THE INVENTION

The invention relates to a filter element, in particular for gas filtration, for example, for an air filter, with a filter medium body enclosing an inwardly positioned flow space and having a support frame arranged at its inner side, with at least one circumferentially extending sealing ring lip projecting axially past an end face of the filter medium body for sealing relative to a housing component of a receiving filter housing. Furthermore, the invention relates to a filter device with such a filter element. Such air filters are used, for example, for filtration of intake air of an internal combustion engine in vehicles.

WO 01/02079 A1 discloses a filter element for air filtration in internal combustion engines that comprises a hollow cylindrical filter medium body with an inwardly positioned support frame as well as two end face end disks. An axially projecting circumferentially extending sealing collar is formed as one piece together with an end disk and, in the mounted state, is engaged around by a housing component of a filter housing and, at its radial inwardly positioned side, contacts radially a correlated wall of the housing component.

In an air filter known from DE 10 2008 027 279 A1, a circumferentially extending sealing body is also formed as one piece together with an end disk and axially projects past the end disk. An annular groove is provided in the sealing body and is engaged for stabilization by a projection at the bottom of a housing part.

SUMMARY OF THE INVENTION

The invention has the object to configure with simple constructive measures a filter element whose filter medium body encloses an inwardly positioned flow space as well as a filter device in such a way that raw side and clean side are flow-tightly separated permanently.

This object is solved according to the invention by a filter element of the afore mentioned kind that, at a radial distance to the sealing ring lip, comprises a support ring arranged at the end face of the filter medium body, wherein the support ring is supported in radial direction at the support frame, wherein the support ring is formed as one piece together with the support frame. The object is further solved by a filter device comprising such a filter element and a filter housing for receiving such a filter element.

The dependent claims provide expedient further developments.

The filter element according to the invention is preferably used for gas filtration, for example, as an air filter for filtration of combustion air to be supplied to an internal combustion engine. The filter element comprises a filter medium body which at least partially encloses an inwardly positioned flow space. The filter medium body is configured as a hollow body, for example, hollow cylindrical or conical with a circular or with an oval cross section, so that the inwardly positioned flow space is circumferentially enclosed in radial direction, relative to the longitudinal axis of the filter element, by the filter medium body. The filter medium body is provided at its inner side with a support frame that is configured as a center tube and that imparts increased stability to the filter medium body. The filter medium body is comprised of a filter medium that, for example, is embodied as a folded filter with a plurality of filter folds. Flow through the filter element is realized, relative to the filter element longitudinal axis, in radial direction, preferably in radial direction from the exterior to the interior, so that the externally positioned side of the filter medium body forms the raw side and the inwardly positioned flow space communicates with the clean side of the filter medium body. In this type of flow through the filter element, discharge is realized axially away from the inwardly positioned flow space.

At least at one end face, preferably at both oppositely positioned end faces, an end disk is arranged at the filter medium body. At least one of the end disks is preferably of an annular configuration and comprises a central opening through which the fluid is discharged away from the inwardly positioned flow space or is guided into the flow space.

At an end face of the filter medium body, an axially projecting circumferentially extending sealing ring lip is arranged that serves for sealing relative to a housing component that is part of a receiving filter housing into which the filter element is insertable. The housing component is, for example, a housing base body or a connecting socket with which the housing base body can be connected. The connecting socket is, for example, mounted fixedly on a vehicle. The housing base body can be detachably connectable with the connecting socket and can form at least partially a cover closing off the filter housing or can be closable by a cover.

At the end face of the filter medium body, at a radial distance to the sealing ring lip, a circumferentially extending support ring is arranged. The support ring is supported in radial direction at the support frame of the filter medium body. This configuration has the advantage that, in the mounted state, the support ring can absorb radial supporting forces which originate from the housing component and are introduced into the support frame. The sealing ring lip must not absorb supporting forces in radial direction but must only absorb sealing forces which are produced by contacting the housing component. The sealing ring lip is thus relieved of radial supporting forces so that there is also no risk of a deformation of the sealing lip which could lead to leakage.

Expediently, the support ring is comprised of a stronger material than the sealing ring lip; the support ring comprises in particular a significantly lower elasticity than the sealing ring lip. Accordingly, the support ring is capable of absorbing the supporting forces in radial direction without significant deformation.

According to the invention, the support ring is embodied as one piece together with the support frame at the inner side of the filter medium body. By means of the connection with the support frame, the forces which are acting from the housing component on the support ring are transferred to the support frame. Support ring and support frame are advantageously embodied as plastic components and can be produced optionally by a plastics injection molding process.

In an alternative embodiment, the support ring and the support frame form separate components that are not embodied together as one piece, wherein the support ring advantageously is connected to the support frame so that the forces, in particular in radial direction, can be transmitted from the support ring to the support frame.

Axial forces that are acting on the support ring are preferably also introduced, at least partially, into the support frame. However, it can be expedient to absorb at least some of the axial supporting forces also by an end disk that is covering the end face of the filter medium body and has the support ring arranged at its outer side.

According to a further expedient embodiment, the sealing ring lip is formed together with an end disk as one piece. End disk and sealing ring lip are comprised preferably of a sealing foam and are produced in a common working step. The end disk is connected seal-tightly with the filter medium body and covers it at least at the end face.

It can be expedient to introduce overflow openings for the sealing material of the sealing ring lip into the support ring. Through the overflow openings, the sealing material, for example, can flow to the shaping tool of the sealing ring lip so that spreading of the sealing material in the desired direction is enabled. Advantageous is also that sealing material remains also in the overflow openings and ensures a fixed connection between the sealing material and the support ring after hardening of the sealing material.

Moreover, it can be expedient that the support ring is covered by the sealing material of the sealing ring lip. In this way, on the one hand, a connection between the sealing ring lip and the support ring is provided. On the other hand, the support ring has a surface with increased friction so that an improved clearance-free seat in the filter housing is ensured. The support ring is thus embedded in the sealing material of the sealing lip. In particular in the preferred case where sealing ring lip and end disk are embodied together as one piece, the support ring is thus also embedded in the material of the end disk.

According to a further expedient embodiment, the support ring comprises an L-shaped cross section with an axial and a radial support leg. The axial support leg projects axially past the exterior side of the end disk, the radial support leg extends parallel to the exterior side of the end disk and can optionally rest immediately on the end disk. By means of the radial support leg, the connection to the support frame at the inner side of the filter medium body can be created.

According to yet another expedient embodiment, the sealing ring lip is resting against the radial support leg. The sealing ring lip is located, according to a preferred embodiment, radially at the inwardly positioned side and the support ring radially at the externally positioned side at the end face of the filter medium body or the end disk.

In case of an L-shaped cross section of the support ring, it can be expedient to introduce overflow openings for the sealing material of the sealing ring lip into the axial as well as into the radial support leg of the support ring, respectively.

According to yet another expedient embodiment, the support ring comprises a radially offset end section at its end face. The end section is located for a support ring with L-shaped cross section at the end face of the axial support leg and is radially displaced relative to the main part of the axial support leg, for example, outwardly in radial direction. In this way, a shoulder is created in the axial support leg adjacent to its end face whereby an improved connection is achieved upon coating of the support ring with sealing material.

The filter device comprises a filter housing for receiving the filter element; it is usually comprised of a connecting component for the filter element, a filter base housing, and a housing cover to be positioned thereon. Filter base housing and housing cover each form a housing component or are embodied together as one piece. A housing component, in particular an outlet socket to which the filter base housing can be connected, engages in the mounted state across the support ring as well as the sealing ring lip which are arranged radially displaced relative to each other at the end disk. Accordingly, the sealing ring lip is resting against the housing component or is supported at the housing component at a radial side and the support ring at the oppositely positioned radial side.

Preferably, the engaging housing component, in particular, the outlet socket for the clean fluid, comprises a receiving groove for the support ring and the sealing ring lip. The radially inwardly positioned wall of the receiving groove extends in this context advantageously at a slant to a center axis of the filter element so that the receiving groove widens in a direction toward the filter element. In this way, the sealing ring lip can be positioned easily relative to the receiving groove. Upon further insertion of the filter element, the sealing ring lip is pushed radially outwardly so that the sealing ring lip in the mounted state is contacting seal-tightly the radial inner wall of the receiving groove.

According to a further advantageous embodiment, a counter contour element, formed at the engaging housing component of the filter housing, engages the intermediate space which is formed between the support ring and the sealing ring lip. The counter contour element can be embodied in circumferential direction continuously or with interruptions. The counter contour element engaging the intermediate space provides for a radial support of the sealing ring lip as well as of the support ring. The counter contour ring is preferably formed as one piece together with the housing component.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF THE PREFERRED EMBODIMENTS

The filter element 1 is configured as a hollow body with an oval or elliptical cross section and, relative to its longitudinal axis 5, is flowed through in radial direction from the exterior to the interior by the fluid to be cleaned. The filter element 1 is, for example, used for gas filtration, in particular for an air filter of an internal combustion engine.

Figure 1:
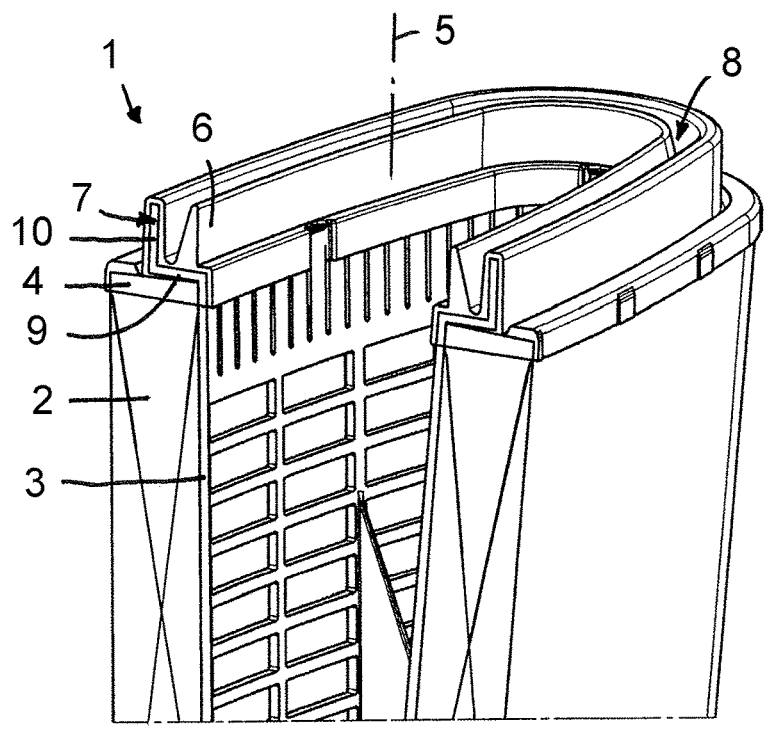
FIG. 1 shows a filter element, which is insertable into an air filter for an internal combustion engine, in perspective and sectioned illustration.

The filter element 1 comprises a filter medium body 2 at which the filtration is taking place and which is configured, for example, as a folded filter. At the inner side that forms the clean side, a support frame 3 is formed at the filter medium body 1 and imparts stability to the filter medium body 2. At the end face, the filter medium body 2 is covered by an annular end disk 4 which closes off the end face flow-tightly. The end disk 4 is formed as one piece together with the circumferential sealing ring lip 6 which is projecting axially past the exterior side. Also, a support ring 7 is embedded in the end disk 4 which is arranged in radial direction farther outwardly and extends concentrically to the circumferential sealing ring lip 6. The support ring 7 is positioned radially at a distance to the inwardly positioned sealing ring lip 6; between support ring 7 and sealing ring lip 6 there is a circumferentially extending intermediate space 8. Also, the support ring 7 projects axially past the end face of the filter medium body 2. As shown in FIG. 1 as well as in FIGS. 2-4, the sealing ring 6 has a substantially triangular cross section that narrows starting from the radial support leg 9 outwardly to an axial outer tip of the sealing ring 6.

The support ring 7 has in cross section an L-shape and is comprised of a radial support leg 9 and an axial support leg 10. The radial support leg 9 is resting indirectly via end disk 4 or immediately against the filter medium 2 and extends radially outwardly up to the support leg 10 with which the end face of the radial support leg 9 is connected. Advantageously, the support frame 3 and the support ring 7 form a one-piece plastic component which can be produced by an injection molding process.

The radial support leg 9 is carrier of the sealing ring lip 6. The end disk 4 and the sealing ring lip 6 are comprised preferably of the same sealing material and can be formed together as one piece. In this context, the radial and/or the axial support legs 9, 10 are provided with overflow openings 11 (FIG. 4) through which the liquid sealing material or the sealing foam can pass during manufacture of end disk 4 and sealing ring lip 6. After solidification, the sealing material is located also in the overflow openings 11 whereby a fixed connection between the sealing material and the support ring 7 is created. The support ring 7 is additionally coated at its side faces and end edge by the sealing material.

Figure 2:
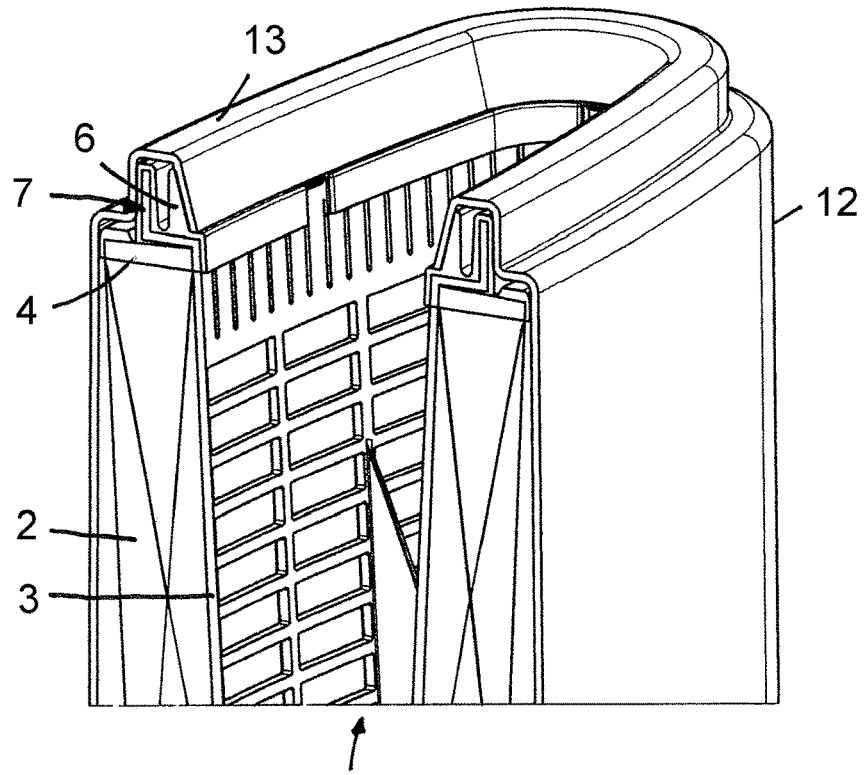
FIG. 2 shows the filter element according to FIG. 1 with an engaging housing component.

FIG. 2 shows the filter element 1 with a schematically illustrated housing component 12 of a filter housing. The filter element 1 is inserted into the housing component 12 wherein the end face of the filter element 1 is engaged across by the housing component 12. The housing component 12 comprises in the end face region a circumferentially extending trough 13 or a receiving groove in which the sealing ring lip 6 and the support ring 7 are accommodated. At the radially inwardly positioned trough wall of the trough 13, the exterior side of the sealing ring lip 6 is resting; at the radial outwardly positioned trough wall the exterior side of the support ring 7 is resting. The support ring 7 absorbs radial forces which are exerted by the trough 13 of the housing component 12 and transmits them to the support frame 3. The sealing ring lip 6 is exposed to relatively minimal radial forces and is positioned flat against the inner side of the trough wall so that a flow-tight connection is achieved.

Figure 3:
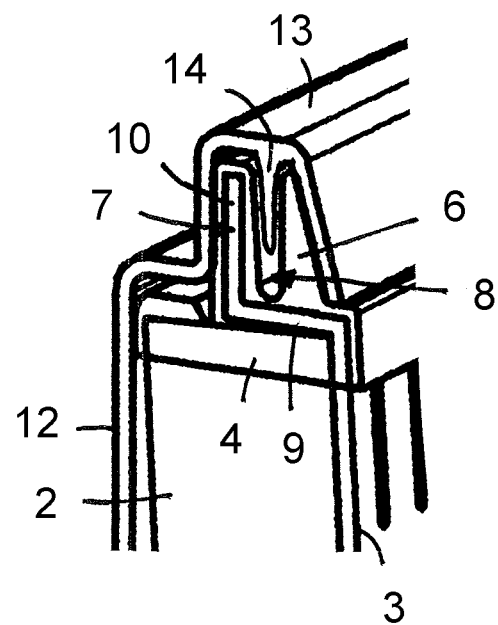
FIG. 3 is an enlarged illustration the end face region of the filter element with engaging housing component in an embodiment variant.

In FIG. 3, an embodiment variant is illustrated in which a counter contour element 14 of the housing component 12 is projecting into the intermediate space 8 between the sealing ring lip 6 and the support ring 7. The counter contour element 14 is located at the trough 13 of the housing component 12 and extends in the mounted state in axial direction. The counter contour element 14 fills the intermediate space 8 between sealing ring lip 6 and support ring 7 at least partially, as needed completely, and is formed as one piece together with the housing component 12. The counter contour element 14 stabilizes the sealing ring lip 6 as well as the support ring 7 in radial direction.

Figure 4:
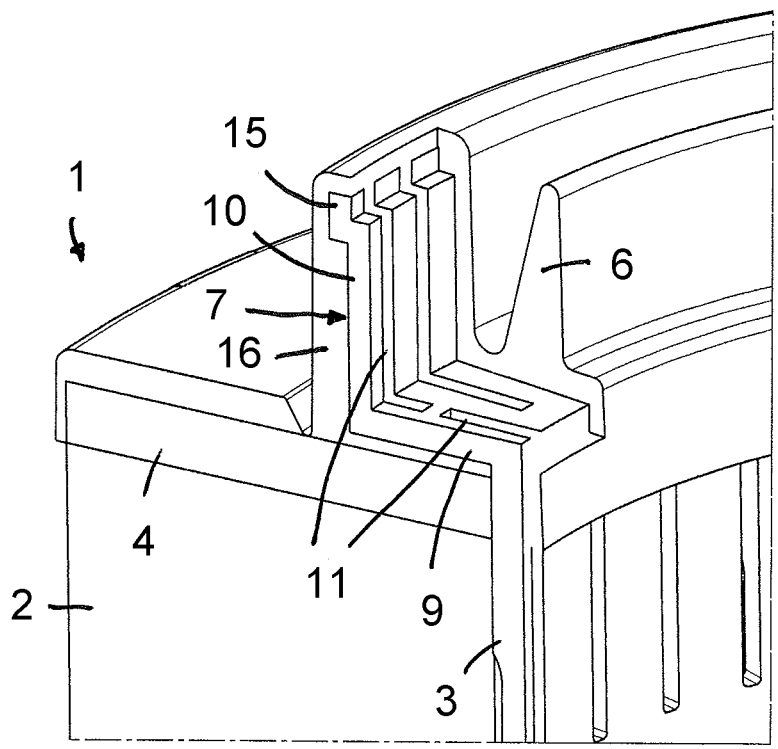
FIG. 4 shows the end face region of the filter element in a further embodiment variant.

In FIG. 4, an embodiment variant is illustrated in which the end face end of the axial support leg 10 of the support ring 7 comprises a radially outwardly offset end section 15. In this way, the axial support leg 10 comprises a shoulder which improves the connection with the coating 16 of sealing material.

In FIG. 4, the overflow openings 11 are also illustrated which are provided in the radial support leg 9 as well as in the axial support leg 10 of the support ring 7 and through which liquid sealing material, for example, sealing foam, which forms the sealing ring lip 6, can pass during manufacture.

What is claimed is:
1. A filter element comprising:
a filter medium body enclosing an inwardly positioned flow space and surrounding a center axis, the filter medium body having
a radial outer side;
a radial inner side; and
an annular axial end face;
wherein an axial direction, as used herein, is a direction parallel to the center axis;
wherein a radial direction, as used herein, is a direction transverse to the axial direction;
a support frame arranged at the radial inner side of the filter medium body and in the inwardly positioned flow space, the support frame comprising:
a first support frame portion arranged at the radial inner side of the filter medium body and extending axially inwardly from the annular axial end face of the filter medium body into the inwardly positioned flow space;
a radial support leg positioned at the axial end face of the filter medium body, the radial support leg having a first end formed onto the first support frame portion at the axial end face of the filter medium body, the radial support leg projecting radially outwardly at the axial end face towards the radial outer side of the of the filter medium body; and
a support ring having a first axial end formed onto the radial support leg at a position radially outwardly from the first end of the radial support leg, the support ring projecting axially outwardly away from radial support leg and the filter medium body to a second axial end;
at least one circumferentially extending sealing ring lip resting directly on the radial support leg and projecting axially outwardly away from the annular axial end face of the filter medium body, the at least one circumferentially extending sealing ring lip is spaced radially inwardly away from the support ring of the support frame;
wherein the at least one circumferentially extending sealing ring lip has a substantially triangular cross section that narrows starting from the radial support leg outwardly to an axial outer tip of the at least one circumferentially extending sealing ring lip;
wherein the support ring has lower elasticity than the at least one circumferentially extending sealing ring lip, such that housing forces which act on the support ring are transferred to the support frame.

2. The filter element according to claim 1, wherein the at least one sealing ring lip is formed as one piece together with an end disk covering the annular axial end face of the filter medium body.

3. The filter element according to claim 1, wherein the support ring and the radial support leg together form an L-shaped cross section.

4. The filter element according to claim 1, wherein the support ring comprises overflow openings receiving a sealing material of the at least one circumferentially extending sealing ring lip.

5. The filter element according to claim 1, wherein the support ring is coated by a sealing material of the at least one sealing ring lip.

6. The filter element according to claim 1, wherein the at least one sealing ring lip is arranged radially inwardly and the support ring is arranged radially outwardly at the annular axial end face of the filter medium body.

7. The filter element according to claim 1, wherein the support ring comprises a radially offset end face end section at the second axial end of the support ring.

8. A filter device comprising:
a filter element comprising:
a filter medium body enclosing an inwardly positioned flow space and comprising a center axis;
a support frame arranged at an inner side of the filter medium body facing the flow space;
at least one circumferentially extending sealing ring lip arranged at the filter medium body and projecting axially in an axial direction relative to the center axis past an end face of the filter medium body;
a support ring arranged at the end face of the filter medium body at a radial distance to the at least one sealing ring lip in a radial direction relative to the center axis;
wherein the support ring is supported in the radial direction at the support frame, wherein the support ring is formed as one piece together with the support frame;
a filter housing configured to receive the filter element, wherein the at least one sealing ring lip is configured to seal relative to a housing component of the filter housing;
wherein the support ring and the at least one sealing ring lip are resting against or supported at radially oppositely positioned sides of the housing component engaging across the support ring and the at least one sealing ring lip;
wherein the housing component comprises a receiving groove configured to receive the support ring and the at least one sealing ring lip;
wherein a radially inwardly positioned wall of the receiving groove extends at a slant relative to the center axis so that the receiving groove widens inwardly in the radial direction in the direction toward the filter element.

9. The filter device according to claim 8, wherein the housing component comprises a counter contour element projecting into an intermediate space between the support ring and the at least one sealing ring lip.

* * * * *